(12) United States Patent
Breitenfeld et al.

(10) Patent No.: US 11,496,587 B2
(45) Date of Patent: *Nov. 8, 2022

(54) METHODS AND SYSTEMS FOR SPECIFICATION FILE BASED DELIVERY OF AN IMMERSIVE VIRTUAL REALITY EXPERIENCE

(71) Applicant: Verizon Patent and Licensing Inc., Arlington, VA (US)

(72) Inventors: Denny Breitenfeld, Florham Park, NJ (US); Qian Su, Old Bridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 957 days.

This patent is subject to a terminal disclaimer.

(21) Appl. No.: 15/141,755

(22) Filed: Apr. 28, 2016

(65) Prior Publication Data

US 2017/0318126 A1 Nov. 2, 2017

(51) Int. Cl.
| | |
|---|---|
| *H04L 67/131* | (2022.01) |
| *H04L 67/141* | (2022.01) |
| *G06F 8/65* | (2018.01) |
| *G06F 3/01* | (2006.01) |
| *H04L 41/0816* | (2022.01) |

(52) U.S. Cl.
CPC .............. *H04L 67/38* (2013.01); *G06F 3/011* (2013.01); *G06F 8/65* (2013.01); *H04L 41/0816* (2013.01); *H04L 67/141* (2013.01)

(58) Field of Classification Search
CPC ..... H04L 67/38; H04L 67/06; H04L 41/0816; G06F 8/65; G06F 3/011; A63F 13/12
See application file for complete search history.

(56) References Cited

U.S. PATENT DOCUMENTS

| | | | |
|---|---|---|---|
| 6,377,263 B1 * | 4/2002 | Falacara | G06N 3/006 345/473 |
| 7,155,680 B2 * | 12/2006 | Akazawa | G06F 3/04815 715/757 |
| 9,536,344 B1 | 1/2017 | Baszucki et al. | |
| 9,539,498 B1 * | 1/2017 | Hanke | A63F 13/00 |
| 2005/0022133 A1 | 1/2005 | Sakamoto et al. | |
| 2006/0059510 A1 * | 3/2006 | Huang | G11B 27/034 725/32 |
| 2010/0229106 A1 | 9/2010 | Lee et al. | |

(Continued)

*Primary Examiner* — Nam T Tran

(57) ABSTRACT

An exemplary virtual reality media provider system ("system") receives, from a media player device ("device") by way of a network, a request for the device to provide a user with an immersive virtual reality experience. The system transmits, to the device by way of the network and in response to the request, a specification file corresponding to the immersive virtual reality experience. The specification file comprises data that defines a plurality of elements included in the immersive virtual reality experience, associates an event with a particular element included in the plurality of elements, and associates a behavior with the event that is associated with the particular element, the behavior configured to be performed with respect to the particular element in response to an occurrence of the event within the immersive virtual reality experience. The device uses the specification file to provide the user with the immersive virtual reality experience.

23 Claims, 15 Drawing Sheets

(56) References Cited

U.S. PATENT DOCUMENTS

| | | |
|---|---|---|
| 2013/0038601 A1 | 2/2013 | Han et al. |
| 2014/0114845 A1 | 4/2014 | Rogers et al. |
| 2016/0124499 A1* | 5/2016 | Shiu ........................ G06F 3/011 715/778 |
| 2017/0052973 A1 | 2/2017 | Wang et al. |

* cited by examiner

```
{
    type: VR360Player,
    uniqueName: "/player/main",
    url: "http://source.com/source",
    cameraType: "EQUIRECTANGULAR"
    domeOrientation: "up",
    cameraPovAngle: 90.0,
    onTimeInVideoList: [
        {
        type: OnTimeInVideo,
        time: 30.0f,
        onTrigger: [ ... ]
        },
    ...
    ]
}
```

METHODS AND SYSTEMS FOR SPECIFICATION FILE BASED DELIVERY OF AN IMMERSIVE VIRTUAL REALITY EXPERIENCE

BACKGROUND INFORMATION

Advances in computing and networking technology have made new forms of media content possible. For example, virtual reality media content is available that may immerse viewers (or "users") into interactive virtual reality worlds that the users may experience by way of a media player device by directing their attention to any of a variety of things being presented in the immersive virtual reality world at the same time. For example, at any time during the presentation of the virtual reality media content, a user experiencing the virtual reality media content may look around the immersive virtual reality world in any direction with respect to both a horizontal dimension (e.g., forward, backward, left, right, etc.) as well as a vertical dimension (e.g., up, down, etc.), giving the user a sense that he or she is actually present in and experiencing the immersive virtual reality world.

For a user to experience an immersive virtual reality world by way of a media player device, the media player device may communicate with a plurality of remotely located systems (e.g., servers, computing systems implementing micro applications, etc.) by way of a network. For example, the media player device may acquire various components (e.g., 360 degree virtual reality video, images, text, advertisement targets, etc.) of the immersive virtual reality world from different remotely located systems by way of the network and then combine the components in a manner that provides a seamless immersive virtual reality experience for the user.

To facilitate this seamless virtual reality experience for the user, a virtual reality media provider system (e.g., a server operated by a virtual reality service provider) may provide the media player device with instructions that specify how the media player device is to acquire and combine the components of the immersive virtual reality world from the various remotely located systems by way of the network. Because there are many types of media player devices that operate on many different platforms (e.g., iOS, Android, Windows, webOS, etc.), it may be difficult, cumbersome, and/or costly for the virtual reality media provider system to maintain and provide different versions of the instructions that are platform-specific so that each of the different types of media player devices operating on the different platforms can interpret the instructions and provide the immersive virtual reality experience to their respective users.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIGS. 7-11 show exemplary code implementations of portions of a specification file according to principles described herein.

DETAILED DESCRIPTION OF PREFERRED EMBODIMENTS

Figure 1:
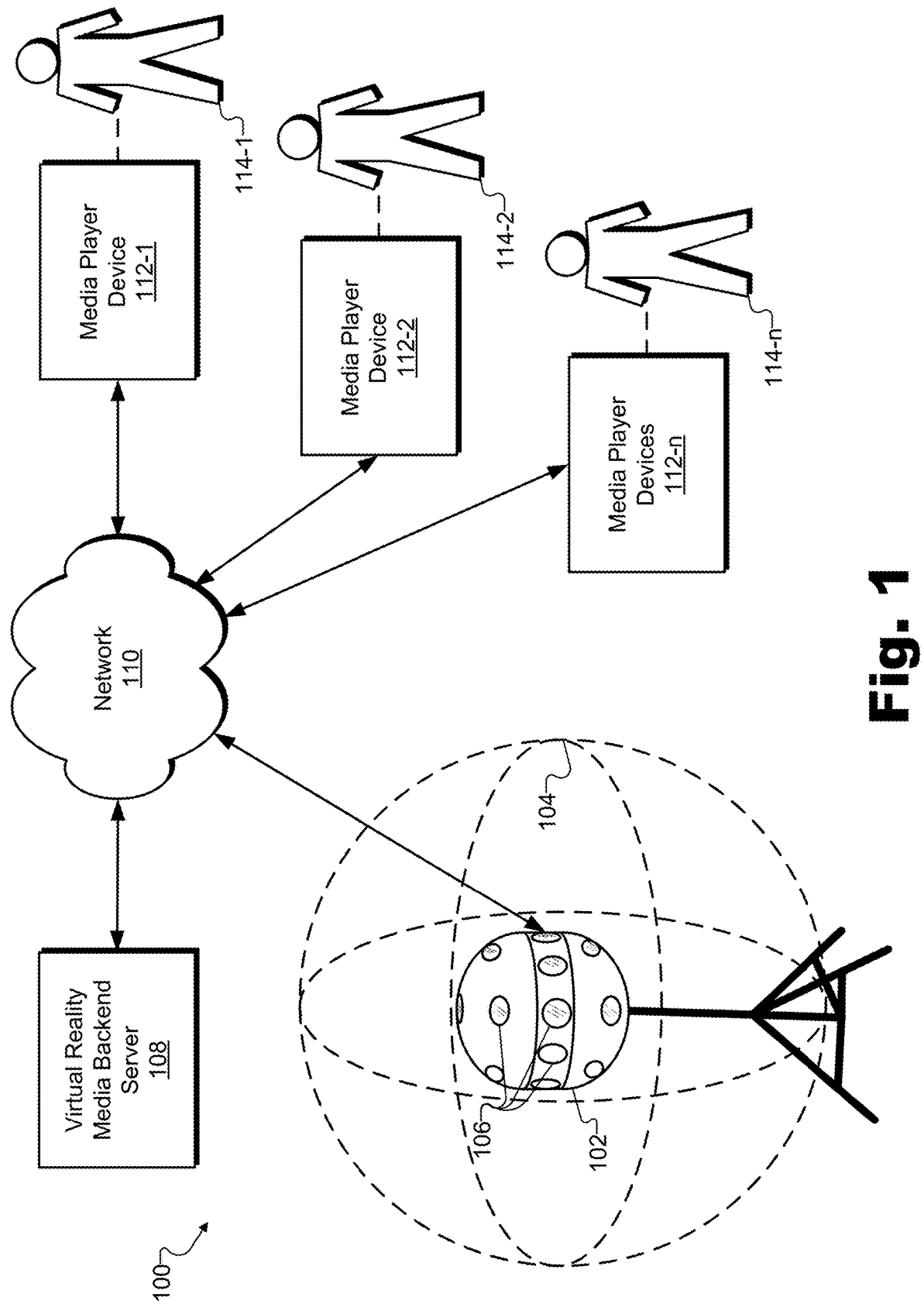
FIG. 1 illustrates an exemplary configuration in which exemplary implementations of a 360-degree camera, a virtual reality media backend server, and one or more media player devices are described according to principles described herein.

Methods and systems for specification file based delivery of an immersive virtual reality experience to a user by way of a media player device are described herein. As will be described in more detail below, a virtual reality media provider system may receive, from a media player device by way of a network, a request for the media player device to provide a user with an immersive virtual reality experience. In response to the request, the virtual reality media provider system may transmit a specification file corresponding to the immersive virtual reality experience to the media player device by way of the network. The media player device may use the specification file to provide the user with the immersive virtual reality experience, as will be explained in more detail below.

As used herein, an "immersive virtual reality experience" refers to a presentation of virtual reality content within an immersive virtual reality world to a user by way of a media player device. The immersive virtual reality experience may be fully immersive in the sense that the user may not be presented with any image of the real world in which the user is located while the user is experiencing the immersive virtual reality experience, in contrast to certain "augmented reality" technologies. However, while real-world scenery directly surrounding the user may not be presented together with the immersive virtual reality experience, the immersive virtual reality experience may, in certain examples, be generated based on data (e.g., image and/or audio data) representative of camera-captured real-world scenery rather than animated or computer-generated scenery of imaginary worlds such as those commonly generated for video games, animated entertainment programs, and so forth. For example, as will be described in more detail below, camera-captured real-world scenery may include real-world places (e.g., city streets, buildings, landscapes, etc.), real-world events (e.g., sporting events, large celebrations such as New Year's Eve or Mardi Gras, etc.), fictionalized live action entertainment (e.g., virtual reality television shows, virtual reality movies, etc.), and so forth.

A "specification file" that corresponds to an immersive virtual reality experience refers to data that instructs a media player device how to provide the immersive virtual reality experience to a user (e.g., by presenting virtual reality content within an immersive virtual reality world for experiencing by the user).

For example, the specification file may include data that defines a plurality of elements (e.g., 360 degree virtual reality video, three-dimensional ("3D") objects, two-dimensional ("2D") images, text, advertisement targets, etc.) included in the immersive virtual reality experience. The specification file may define a particular element by providing a link for use by the media player device in acquiring, by way of the network, the element while providing the user with the immersive virtual reality experience. The specification file may further define an element in a variety of other ways, as will be described below.

The specification file may further include data that associates one or more events with one or more of the elements defined in the specification file. An "event" may be defined by one or more conditions that, when satisfied, indicate an occurrence of the event. To illustrate, an event labeled "OnClickEvent" and associated with a particular element may be defined by a condition that specifies that the particular element must be selected (e.g., clicked on) in order for the event to occur. Various exemplary events that may be specified within the specification file will be described herein.

The specification file may further include data that associates one or more behaviors with one or more events specified in the specification file. A "behavior" associated with an event that is associated with a particular element may refer to a set of one or more defined instructions that the media player device performs with respect to the particular element in response to an occurrence of the behavior's associated event. To illustrate, a behavior labeled "ShowAd" may specify that the media player device is to show a particular advertisement within the immersive virtual reality experience in response to a particular element being selected by the user. Various exemplary behaviors that may be specified within the specification file will be described herein.

The methods and systems described herein may facilitate a seamless, efficient, and universal immersive virtual reality experience for users of media player devices. For example, by utilizing a specification file to instruct a media player device how to provide an immersive virtual reality experience to a user, the methods and systems described herein may provide a standard for virtual reality content creators in order to ensure that the virtual reality content creators create virtual reality content that complies with codec capabilities of the various media player devices that will be used to present the virtual reality content. Moreover, the specification file may be configured to be device platform agnostic. In other words, the specification file may adhere to a data input format that is readable by a plurality of different media player devices operating within a plurality of different platforms. In this manner, the same specification file may be used to instruct each of the different media player devices operating within the plurality of different platforms how to provide the immersive virtual reality experience to a user.

Various embodiments will now be described in more detail with reference to the figures. The disclosed methods and systems may provide one or more of the benefits mentioned above and/or various additional and/or alternative benefits that will be made apparent herein.

FIG. 1 illustrates an exemplary configuration 100 in which exemplary embodiments of a 360-degree camera, a virtual reality media backend server, and one or more media player devices operate to facilitate prediction-based methods and systems for efficient distribution of virtual reality media content. As shown in FIG. 1, a 360-degree camera 102 ("camera 102") may capture and/or generate a 360-degree image of real-world scenery 104 around a center point corresponding to camera 102. For example, camera 102 may capture a plurality of images from each of a plurality of segment capture cameras 106 built into or otherwise associated with camera 102, and may generate the 360-degree image of real-world scenery 104 by combining the plurality of images captured by segment-capture cameras 106.

Camera 102 may capture data representative of 360-degree images of real-world scenery 104 and transmit the data to a virtual reality media backend server 108 ("backend server 108") by way of a network 110. After preparing and/or processing the data representative of the 360-degree images to generate an immersive virtual reality world based on the 360-degree images, backend server 108 may transmit data representative of the immersive virtual reality world to one or more media player devices 112 (e.g., media player devices 112-1 through 112-n), and users 114 (e.g., users 114-1 through 114-n) may experience the immersive virtual reality world by way of media player devices 112. Each of the elements of configuration 100 will now be described in detail.

Camera 102 may be set up and/or operated by a virtual reality content creator and may include any type of camera that is configured to capture data representative of a 360-degree image of real-world scenery 104 around a center point corresponding to camera 102. As used herein, a 360-degree image is any still or video image that depicts the surroundings (e.g., real-world scenery 104) of a center point (e.g., a center point associated with the location of camera 102) on all sides along at least one dimension. For example, one type of 360-degree image may include a panoramic image that depicts a complete 360-degree by 45-degree ring around a center point corresponding to a camera (e.g., camera 102). Another type of 360-degree image may include a spherical image that depicts not only the ring around the center point, but an entire 360-degree by 180-degree sphere surrounding the center point on all sides. In certain examples, a 360-degree image may be based on a non-circular geometric structure. For example, certain 360-degree images may be based on cubes, rectangular prisms, pyramids, and/or other geometric structures that may serve a particular implementation, rather than being based on spheres.

Camera 102 may be configured to capture the data representative of the 360-degree image of real-world scenery 104 in any way that may serve a particular implementation. For example, as shown in FIG. 1, camera 102 may capture various segments of real-world scenery 104 using segment capture cameras 106, which may each capture an image of a single segment of real-world scenery 104 that may be combined (e.g., stitched together) with other segments to generate the 360-degree image of real-world scenery 104. In certain examples, segment capture cameras 106 may each represent a single camera unit (e.g., including a lens and suitable image capture hardware) built into a single 360-degree camera configured to capture 360-degree images. In other examples, camera 102 may include an array of segment capture cameras 106 that are each a single, standalone camera configured to capture standard images (e.g., images depicting less than a 360-degree view) that may later be combined to form the 360-degree image. In yet other examples, camera 102 may include one or more "fish-eye" lenses configured to capture a very wide-angle image (e.g., a spherical image or a semi-spherical image) that can be used as the 360-degree image or processed to generate the 360-degree image. Alternatively, camera 102 may include a single, standard camera that captures and/or combines a plurality of still images of real-world scenery 104 taken at different points in time (e.g., using a "panorama mode" of the camera or a similar feature) to capture still 360-degree images. In certain examples, camera 102 may include one or more stereoscopic cameras. Camera 102 may also use any combination of the 360-degree image capture techniques described above or any other capture techniques that may serve a particular implementation.

Subsequent to capturing raw image data representative of real-world scenery 104, camera 102 may generate from the raw image data a 360-degree image of real-world scenery 104. For example, camera 102 may be configured to automatically process the raw image data (e.g., by combining a plurality of images captured by segment capture cameras 106, by processing images captured by a fish-eye lens, etc.) to form the 360-degree image, and then may transmit data representative of the 360-degree image to backend server 108. Alternatively, camera 102 may be configured to transmit the raw image data directly to backend server 108, and any processing and/or combining of the raw image data may be performed within backend server 108.

Camera 102 may capture any real-world scenery 104 that may serve a particular embodiment. For example, real-world scenery 104 may include any indoor or outdoor real-world location such as the streets of a city, a museum, a scenic landscape, a satellite orbiting and looking down upon the Earth, the surface of another planet, or the like. Real-world scenery 104 may further include certain events such as a stock car race, a football game or other sporting event, a large-scale party such as New Year's Eve on Times Square in New York City, or other events that may interest potential users. In certain examples, real-world scenery 104 may be a setting for a fictionalized event, such as a set of a live-action virtual reality television show or movie.

In some implementations, capturing real-world scenery 104 using camera 102 may be optional. For example, a 360-degree image of scenery surrounding a center point may be completely computer-generated (e.g., animated) based on models of an imaginary world rather than captured from real-world scenery 104 by camera 102. As such, camera 102 may be omitted in certain examples.

Backend server 108 may be implemented by one or more servers and/or or other computing devices associated with (e.g., provided and/or managed by) a virtual reality media content service provider (e.g., a network service provider, a cable service provider, a satellite service provider, an Internet service provider, a provider of virtual reality mobile applications, etc.) and may be configured to provide virtual reality media content to users (e.g., subscribers of a virtual reality media content service, users who download or otherwise acquire virtual reality mobile applications, etc.) by way of media player devices 112. To this end, backend server 108 may receive, generate, process, and/or maintain data representative of virtual reality media content. For example, backend server 108 may be configured to receive camera-captured data (e.g., video data captured by camera 102) representative of a 360-degree image of real-world scenery 104 around a center point corresponding to camera 102. If the camera-captured data is raw image data (e.g., image data captured by each of segment capture cameras 106 that has not been combined into a 360-image), backend server 108 may unwrap, combine (i.e., stitch together), or otherwise process the raw image data to form the 360-degree image representative of real-world scenery 104.

Based on the camera-captured data representative of real-world scenery 104 (e.g., the 360-degree image), backend server 108 may generate and maintain an immersive virtual reality world (i.e., data representative of an immersive virtual reality world that may be experienced by a user). For example, backend server 108 may generate a three-dimensional 3D model of the immersive virtual reality world where virtual objects may be presented along with projections of real-world scenery 104 to a user experiencing the immersive virtual reality world. To generate the immersive virtual reality world, backend server 108 may perform video transcoding, slicing, orchestration, modeling, and/or any other processing that may serve a particular embodiment.

As will be described in more detail below, backend server 108 may manage (e.g., generate, maintain, receive, pass through, etc.) specification files that correspond to different immersive virtual reality experiences (e.g., immersive virtual reality worlds). Exemplary specification files will be described in more detail below.

Subsequent to or concurrent with generating one or more immersive virtual reality worlds associated with one or more virtual reality media content instances (also referred to herein as "virtual reality media content programs"), backend server 108 may provide access to the virtual reality media content programs for users such as subscribers of a virtual reality media content service operated by the virtual reality media content provider and/or users who download or otherwise acquire virtual reality mobile applications provided by the virtual reality media content provider. For example, backend server 108 may transmit a specification file corresponding to an immersive virtual reality experience to a media player device associated with a user. The media player device may use the specification file to acquire elements included in the immersive virtual reality experience from backend server 108 and/or one or more other systems and/or applications (e.g., micro applications) by way of network 110. This will be described in more detail below.

Camera 102, backend server 108, and media player devices 112 may communicate with one another using any suitable communication technologies, devices, media, and/or protocols supportive of data communications, including, but not limited to, socket connections, Ethernet, data bus technologies, data transmission media, communication devices, Transmission Control Protocol ("TCP"), Internet Protocol ("IP"), File Transfer Protocol ("FTP"), Telnet, Hypertext Transfer Protocol ("HTTP"), HTTPS, Session Initiation Protocol ("SIP"), Simple Object Access Protocol ("SOAP"), Extensible Mark-up Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), 4G Long Term Evolution ("LTE"), Voice over IP ("VoIP"), Voice over LTE ("VoLTE"), WiMax, Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

Network 110 may include any provider-specific network (e.g., a cable or satellite carrier network or a mobile telephone network), the Internet, wide area network, or any other suitable network. Data may flow between camera 102, backend server 108, and media player devices 112 by way of network 110 using any communication technologies, devices, media, and protocols as may serve a particular implementation. While only one network 110 is shown to interconnect camera 102, backend server 108, and media player devices 112 in FIG. 1, it will be recognized that these devices and systems may intercommunicate by way of multiple interconnected networks as may serve a particular implementation.

Media player devices 112 may be used by users 114 to access and experience virtual reality media content received from backend server 108. To this end, media player devices 112 may each include or be implemented by any device capable of presenting a field of view of an immersive virtual reality world and detecting user input from a user (e.g., one of users 114) to dynamically change the content within the field of view as the user experiences the immersive virtual reality world. For example, media player devices 112 may include or be implemented by a head-mounted virtual reality device (e.g., a virtual reality gaming device) that includes a head-mounted display screen, a personal computer device (e.g., a desktop computer, laptop computer, etc.), a mobile or wireless device (e.g., a smartphone, a tablet device, a mobile reader, etc.), or any other device or configuration of devices that may serve a particular implementation to facilitate receiving and/or presenting virtual reality media content. Different types of media player devices 112 (e.g., head-mounted virtual reality devices, personal computer devices, mobile devices, etc.) may provide different types of virtual reality experiences having different levels of immersiveness for users 114. Additionally, as will be made apparent below, methods and systems for minimizing pixel data transmission described herein may be particularly optimized for certain types (e.g., form factors) of media player devices 112, such as media player devices 112 that include head-mounted display screens (e.g., tethered or untethered media player devices employing head-mounted virtual reality devices (i.e., virtual reality headsets), mobile devices mounted to the head of the user by an apparatus such as a cardboard apparatus, etc.).

Media player devices 112 may be configured to allow users 114 to select respective virtual reality media content programs that users 114 may wish to experience on their respective media player devices 112. In certain examples, media player devices 112 may download virtual reality media content programs that users 114 may experience offline (e.g., without an active connection to backend server 108). In other examples, media player devices 112 may request and receive data streams representative of virtual reality media content programs that users 114 experience while media player devices 112 remain in active communication with backend server 108 by way of network 110.

To facilitate users 114 in experiencing virtual reality media content, each of media player devices 112 may include or be associated with at least one display screen (e.g., a head-mounted display screen built into a head-mounted virtual reality device or a display screen of a mobile device mounted to the head of the user with an apparatus such as a cardboard apparatus) upon which particular scenes of an immersive virtual reality world may be displayed. Media player devices 112 may also include software configured to receive, maintain, and/or process data representative of the immersive virtual reality world to present the particular scenes of the immersive virtual reality world on the display screens of the media player devices. For example, media player devices 112 may include dedicated, standalone software applications (e.g., mobile applications) configured to process and present data representative of immersive virtual reality worlds on the displays. In other examples, the software used to present the particular scenes of the immersive virtual reality worlds may include non-dedicated software such as standard web browser applications.

In some examples, media player devices 112 may be configured to operate within a particular platform. For example, one of media player devices 112 may operate within a platform known as iOS, another one of media player devices 112 may operate within a platform known as Android, one of media player devices 112 may operate within a platform known as Windows, etc. However, each media player device 112 may be configured to read and operate in accordance with the same specification file regardless of the media player devices' respective platforms. In this manner, the same specification file may be used to facilitate presentation of an immersive virtual reality experience by way of any of media player devices 112.

Figure 2:
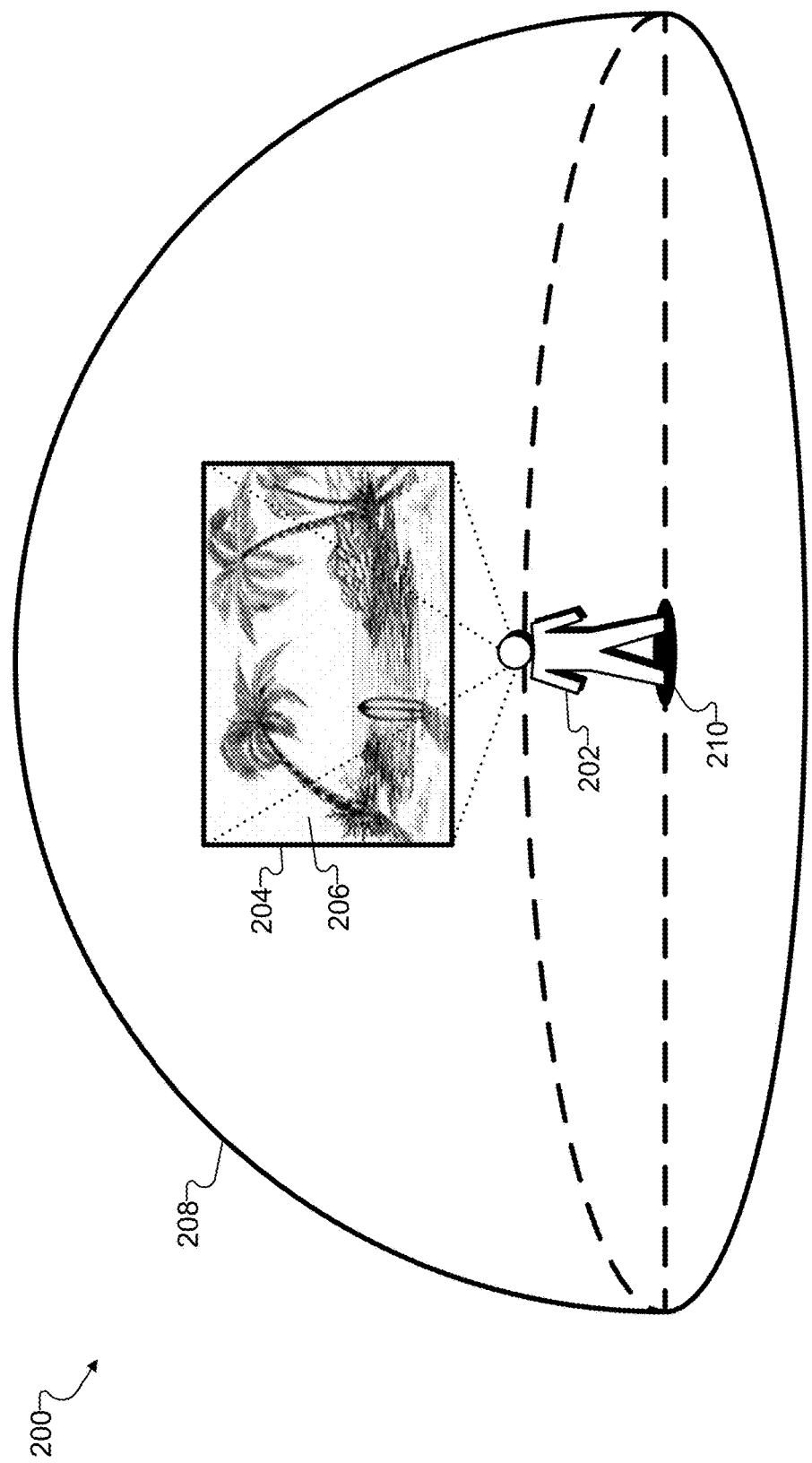
FIG. 2 illustrates an exemplary immersive virtual reality experience according to principles described herein.

FIG. 2 illustrates an exemplary immersive virtual reality experience 200 in which a user 202 is presented with an exemplary field of view 204 that includes content 206 of an exemplary immersive virtual reality world 208. User 202 may experience immersive virtual reality world 208 ("world 208") by providing user input to dynamically change field of view 204 to display whatever content within world 208 that user 202 wishes to view. For example, the user input provided by user 202 may include an indication that user 202 wishes to look at content not currently presented within field of view 204 (i.e., content of world 208 other than content 206). For some types of media player devices 112 (e.g., personal computers and/or mobile devices, this user input may include a mouse movement, navigation key input from a keyboard, a swipe gesture, or the like. For media player devices 112 incorporating particular sensors (e.g., motion, directional, and/or orientation sensors), such as head-mounted virtual reality devices and/or mobile devices, however, this user input may include a change to an orientation of the display screen of the media player device 112 with respect to at least one axis of at least two orthogonal axes. For example, the media player device may be configured to sense changes in orientation of the display screen with respect to an x-axis, a y-axis, and a z-axis that are all orthogonal to one another. As such, the media player device 112 may be configured to detect the change to the orientation of the display screen as user 202 experiences world 208, and the dynamic changing of the content includes gradually replacing content 206 with other content of world 208 that is determined to be visible from a viewpoint of user 202 within world 208 according to the detected change to the orientation of the display screen with respect to the at least one axis.

To illustrate, FIG. 2 shows that content 206 may include real-world scenery depicting a beach with palm trees and a surfboard. User 202 may provide user input to a media player device by which user 202 is experiencing world 208 (e.g., one of media player devices 112) to indicate that user 202 wishes to look at content to the left of content 206 currently included within field of view 204. For example, user 202 may press a left navigation key on a keyboard, perform a swipe gesture to the right, or change the orientation of the display screen with respect to a y-axis by rotating his or her head to the left while wearing a head-mounted device. In response, the real-world scenery (i.e., the palm trees, the surfboard, etc.) may scroll to the right across field of view 204 to give user 202 a sensation that he or she is turning to look to the left in world 208. As content 206 scrolls off the right side of field of view 204, new content (not explicitly shown in FIG. 2) smoothly scrolls onto the left side of field of view 204. In this way, user 202 may provide user input to cause field of view 204 to present any part of world 208 that user 202 desires.

In FIG. 2, world 208 is illustrated as a semi-sphere, indicating that user 202 may look in any direction that is substantially forward, backward, left, right, and/or up. However, if user 202 directs field of view 204 down, world 208 may not include dynamic and/or real-world scenery content to be presented within field of view 204. For example, if world 208 includes a dynamic immersive virtual reality world (i.e., using a 360-degree video image), field of view 204 may present a still image representative of the ground of world 208. In other examples, field of view 204 may present nothing (i.e., a black screen), a menu, one or more virtual objects, or any other suitable image that may serve a particular implementation. In other examples, world 208 may include an entire 360-degree by 180-degree sphere so that every direction in which user 202 may direct field of view 204 is associated with dynamic and/or real-world scenery content of world 208.

As shown in FIG. 2, world 208 may appear to surround a center point 210 associated with user 202. In some embodiments, center point 210 may correspond to a location of a camera (e.g., camera 102) used to capture the content of world 208 (e.g., including content 206). As such, center point 210 may be static or may move through world 208 in a way that user 202 is unable to control (e.g., moving through world 208 in a same manner as camera 102 moved through real-world scenery 104 during the creation of the virtual reality media content). In other embodiments, user 202 may be able to provide input to modify where center point 210 is located within world 208. For example, user 202 may hop from one center point to another (e.g., corresponding to where each of a plurality of 360-degree cameras captured 360-degree images) within world 208 or cause center point 210 to move continuously within world 208. While center point 210 is illustrated at the feet of user 202 for simplicity of illustration, it will be understood that center point 210 may actually be located at the eye level of user 202.

Figure 3:
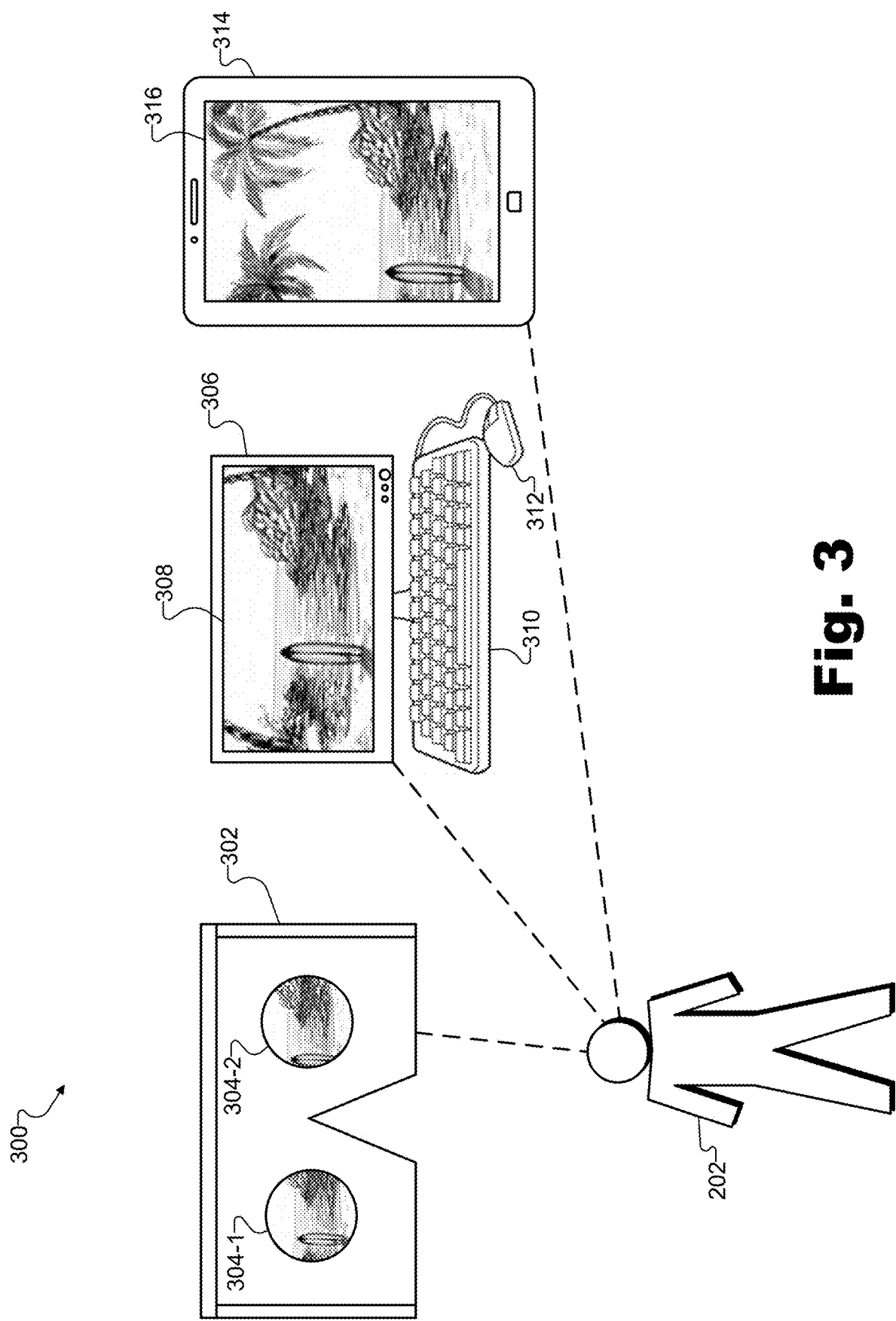
FIG. 3 shows exemplary media player devices configured to facilitate experiencing of an immersive virtual reality experience according to principles described herein.

As mentioned above, different types of media player devices may provide different experiences for user 202 by presenting field of view 204 of world 208 in different ways, by receiving user input from user 202 in different ways, and so forth. To illustrate, FIG. 3 shows exemplary media player devices 300 configured to facilitate experiencing of world 208 by user 202. Media player devices 300 may correspond to media player devices 112, described above in relation to FIG. 1.

As one example, a head-mounted virtual reality device 302 may be mounted on the head of user 202 and arranged so that each of the eyes of user 202 sees a distinct display screen 304 (e.g., display screens 304-1 and 304-2) within head-mounted virtual reality device 302. In some examples, a single display screen 304 may be presented and shared by both eyes of user 202. In other examples, as shown, distinct display screens 304 within head-mounted virtual reality device 302 may be configured to display slightly different versions of field of view 204 (e.g., stereoscopic versions of field of view 204 that may be captured by one or more stereoscopic cameras) to give user 202 the sense that world 208 is three-dimensional. Display screens 304 may also be configured to display content 206 such that content 206 fills the peripheral vision of user 202, providing even more of a sense of realism to user 202. Moreover, head-mounted virtual reality device 302 may include motion sensors (e.g., accelerometers), directional sensors (e.g., magnetometers), orientation sensors (e.g., gyroscopes), and/or other suitable sensors to detect natural movements (e.g., head movements) of user 202 as user 202 experiences world 208. Thus, user 202 may provide input indicative of a desire to move field of view 204 in a certain direction and by a certain amount in world 208 by simply turning his or her head in that direction and by that amount. As such, head-mounted virtual reality device 302 may provide user 202 with a natural and hands-free experience that does not require any physical console control to experience the immersive virtual reality world and that may be the most immersive virtual reality experience provided by any type of media player device.

As another example of a media player device, a personal computer device 306 having a display screen 308 (e.g., a monitor) may be used by user 202 to experience world 208. Because display screen 308 may not provide the distinct stereoscopic view for each of the user's eyes and/or may not fill the user's peripheral vision, personal computer device 306 may not provide the same degree of immersiveness that head-mounted virtual reality device 302 provides. However, personal computer device 306 may be associated with other advantages such as its ubiquity among casual virtual reality users that may not be inclined to purchase or use a head-mounted virtual reality device. In some examples, personal computer device 306 may allow a user to experience virtual reality content within a standard web browser so that user 202 may conveniently experience world 208 without using special devices or downloading special software. User 202 may provide user input to personal computer device 306 by way of a keyboard 310 (e.g., using navigation keys on keyboard 310 to move field of view 204) and/or by way of a mouse 312 (e.g., by moving mouse 312 to move field of view 204). In certain examples, a combination of keyboard 310 and mouse 312 may be used to provide user input such as by moving field of view 204 by way of navigation keys on keyboard 310 and clicking or otherwise interacting with objects within world 208 by way of mouse 312.

As yet another example of a media player device, a mobile device 314 having a display screen 316 may be used by user 202 to experience world 208. Mobile device 314 may incorporate certain advantages of both head-mounted virtual reality devices and personal computer devices to provide the most versatile type of media player device for experiencing world 208. Specifically, like personal computer devices, mobile devices are extremely ubiquitous, potentially providing access to many more people than dedicated head-mounted virtual reality devices. However, because many mobile devices are equipped with motion sensors, directional sensors, orientation sensors, etc., mobile devices may also be configured to provide user 202 with an immersive experience comparable to that provided by head-mounted virtual reality devices. For example, mobile device 314 may be configured to divide display screen 316 into two versions (e.g., stereoscopic versions) of field of view 204 and to present content 206 to fill the peripheral vision of user 202 when mobile device 314 is mounted to the head of user 202 using a relatively inexpensive and commercially-available mounting apparatus (e.g., a cardboard apparatus). In other embodiments, mobile device 314 may facilitate experiencing world 208 by receiving movement-based user input at arm's length (i.e., not mounted to the head of user 202 but acting as a hand-held dynamic window for looking around world 208), by receiving swipe gestures on a touchscreen, or by other techniques that may serve a particular embodiment.

While examples of certain media player devices have been described, the examples are illustrative and not limiting. A media player device may include any suitable device and/or configuration of devices configured to facilitate receipt and presentation of virtual reality media content according to principles described herein. For example, a media player device may include a tethered device configuration (e.g., a tethered headset device) or an untethered device configuration (e.g., a display screen untethered from a processing device). As another example, a head-mounted virtual reality media player device or other media player device may be used in conjunction with a virtual reality controller such as a wearable controller (e.g., a ring controller) and/or a handheld controller.

Figure 4:
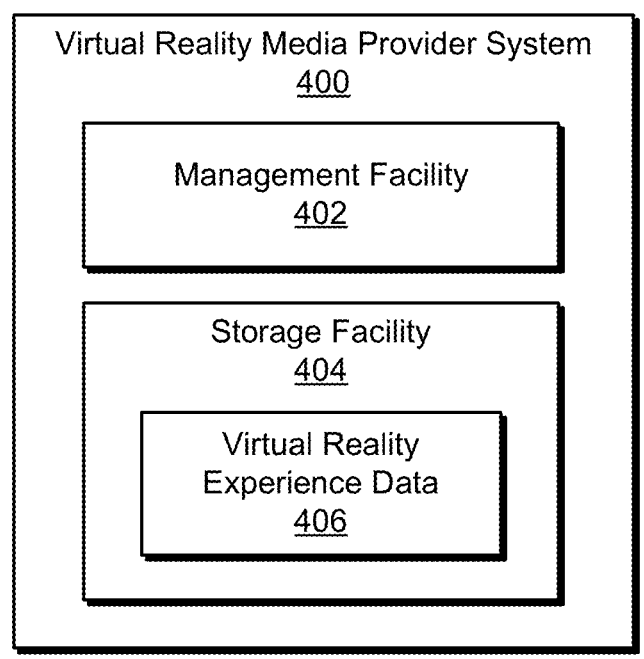
FIG. 4 illustrates an exemplary virtual reality media provider system according to principles described herein.

FIG. 4 illustrates an exemplary virtual reality media provider system 400 ("system 400") configured to facilitate specification file based delivery of an immersive virtual reality experience to a user by way of a media player device. As shown, system 400 may include, without limitation, a management facility 402 and a storage facility 404 selectively and communicatively coupled to one another. It will be recognized that although facilities 402 and 404 are shown to be separate facilities in FIG. 4, facilities 402 and 404 may be combined into fewer facilities, such as into a single facility, or divided into more facilities as may serve a particular implementation.

System 400 may be implemented by or may include one or more devices and/or systems described above in relation to FIG. 1. For example, system 400 may be implemented entirely by backend server 108. In certain embodiments, camera 102, components of network 110, components of media player devices 112, and/or one or more other computing devices (e.g., servers and/or computing devices executing micro applications) may also serve to implement at least certain components and/or operations of system 400.

Storage facility 404 may maintain virtual reality experience data 406 received, generated, managed, maintained, used, and/or transmitted by management facility 402. Virtual reality experience data 406 may include any data associated with providing an immersive virtual reality experience for a user by way of a media player device. In some examples, virtual reality experience data 406 may include a specification file that corresponds to a particular immersive virtual reality experience that may be provided to a user by way of a media player device. Storage facility 404 may maintain additional or alternative data as may serve a particular implementation.

Management facility 402 may perform one or more operations associated with delivering an immersive virtual reality experience to a user by way of a media player device. For example, management facility 402 may manage (e.g., receive, generate, maintain, and/or update) a specification file associated with the immersive virtual reality experience, transmit the specification file to the media player device by way of a network, and provide virtual reality content (e.g., 360 degree virtual reality video, etc.) to the media player device by way of the network. These and other operations that may be performed by management facility 402 will be described in more detail below.

Figure 5:
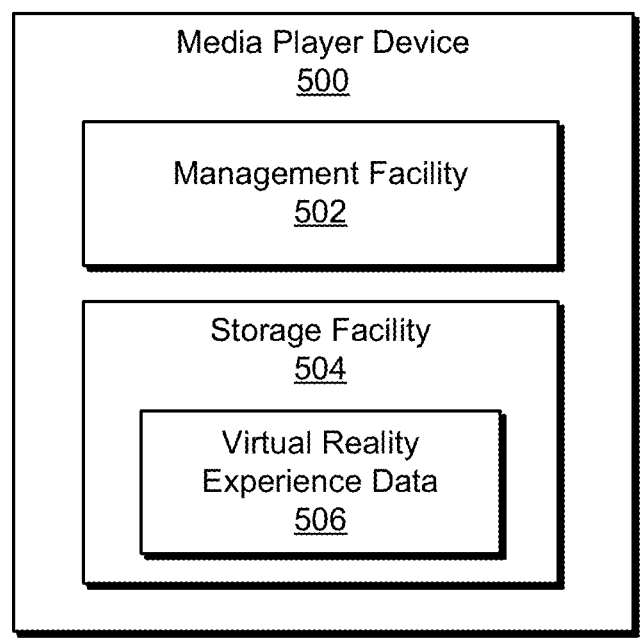
FIG. 5 illustrates an exemplary media player device according to principles described herein.

FIG. 5 illustrates an exemplary media player device 500 that may be used in accordance with the methods and systems described herein. As shown, media player device 500 may include, without limitation, a management facility 502 and a storage facility 504 selectively and communicatively coupled to one another. It will be recognized that although facilities 502 and 504 are shown to be separate facilities in FIG. 5, facilities 502 and/or 504 may be combined into a single facility or divided into more facilities as may serve a particular implementation.

Media player device 500 may be implemented by or may include one or more devices and/or systems described above in relation to FIG. 1 and/or FIG. 3. For example, media player device 500 may be implemented entirely by one of media player devices 112 or media player devices 300. In certain embodiments, camera 102, components of network 110, and/or one or more other computing devices (e.g., servers) remote from and communicatively coupled to media player devices 112 by way of network 110 may also serve to implement at least certain components and/or operations of media player device 500. In some examples, media player device 500 may be configured to render (i.e., to prepare for display and to present) virtual reality content included in an immersive virtual reality experience within a display screen associated with media player device 500.

Storage facility 504 may maintain virtual reality experience data 506 received (e.g., from system 400), generated, managed, maintained, used, and/or transmitted by management facility 502. Virtual reality experience data 506 may include any data associated with providing an immersive virtual reality experience for a user by way of media player device 500. In some examples, virtual reality experience data 506 may include a specification file that corresponds to a particular immersive virtual reality experience that may be provided to a user by way of media player device 500. Storage facility 504 may maintain additional or alternative data as may serve a particular implementation.

Management facility 502 may perform any suitable management operations for proper functionality of media player device 500. For example, management facility 502 may acquire and render virtual reality content included in an immersive virtual reality experience and/or receive and operate in accordance with a specification file that corresponds to an immersive virtual reality experience. These and other operations that may be performed by management facility 502 will be described in more detail below.

Exemplary operations that may be performed by system 400 and media player device 500 in order for media player device 500 to provide a user with an immersive virtual reality experience will now be described.

As mentioned, system 400 may maintain a specification file that corresponds to the immersive virtual reality experience. The specification file includes data that instructs media player device 500 how to provide the immersive virtual reality experience to a user.

Figure 6:
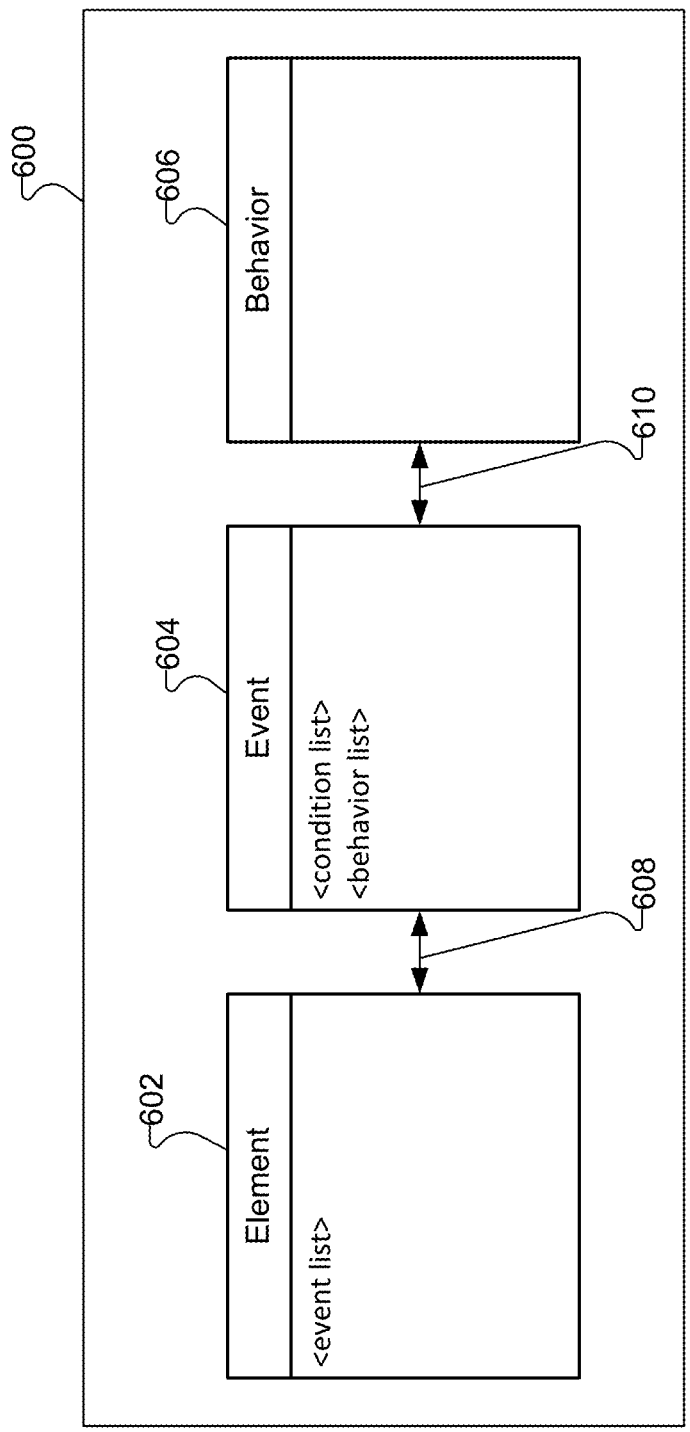
FIG. 6 shows exemplary components of a specification file according to principles described herein.

To illustrate, FIG. 6 shows exemplary components of a specification file 600 that may be maintained by system 400 and that may correspond to an immersive virtual reality experience. As shown, specification file 600 may include data that defines an element 602, an event 604, and a behavior 606. Specification file 600 may further include data that associates event 604 with element 602 (this association is represented by arrow 608) and data that associates behavior 606 with event 604 (this association is represented by arrow 610). For example, as will be illustrated in more detail below, event 604 may be associated with element 602 by including data that identifies event 604 within an event list (shown in FIG. 6 as "<event list>") included within the data that defines element 602. Likewise, behavior 606 may be associated with event 604 by including data that identifies behavior 606 within a behavior list (shown in FIG. 6 as "<behavior list>") included within the data that defines event 604.

While specification file 600 shows a single element, a single event associated with the element, and a single behavior associated with the event, it will be recognized that specification file 600 may define any number of elements, events, and behaviors, that a particular element may be associated with any number of events within specification file 600, and that a particular event may be associated with any number of behaviors within specification file 600.

Specification file 600 may adhere to a data format that is readable by a plurality of different media player devices operation within a plurality of different platforms. For example, specification file 600 may be a text-based file (e.g., a JavaScript Object Notation ("JSON") file) that is readable by any media player device that operates within the plurality of different platforms. While specification file 600 may adhere to any suitable data format, the examples provided herein are shown as being text-based (e.g., a JSON format, an Extensible Markup Language ("XML") format, a Hyper-Text Markup Language ("HTML") format, etc.).

Examples of element 602, event 604, and behavior 606 will now be provided.

Element 602 may include a component or object included in the immersive virtual reality experience. For example, element 602 may include a 360 degree virtual reality video, a 3D object, a 2D image, text, and advertisement target (i.e., a location within the immersive virtual reality experience at which an advertisement is to be presented), etc. Element 602 may be defined within specification file 600 in any suitable manner. For example, element 602 may be defined within specification file 600 by specifying values for a plurality of predetermined fields associated with element 602. One such field represents a link (e.g., a uniform resource locator ("URL")) for element 602. The link may be used by media player device 500 to acquire (e.g., download) element 602 for inclusion in the immersive virtual reality experience. Other fields that may be associated with element 602 include, but are not limited to, a title field that represents a name of the element 602, location fields that identify a spatial location within a field of view of the immersive virtual reality experience at which the element 602 is to be displayed, and an event field that identifies an event (e.g., event 604) that is associated with element 602. Various examples of elements and fields that may be used to define the elements will be provided below.

Event 604 may be defined by one or more conditions that, when satisfied, indicate an occurrence of the event. For example, Table 1, shown below, lists exemplary events that may be defined and used within specification file 600 and that may be associated with element 602. Additional or alternative events may be defined and used within specification file 600 as may serve a particular implementation.

TABLE 1

| Event | Description |
| --- | --- |
| OnLoadEvent | Occurs when associated element is loaded (e.g., when a 360 degree virtual reality video is loaded by media player device 500) |
| OnTimeInVideo | Occurs when an associated video element (e.g., a 360 degree virtual reality video) plays for a predetermined amount of time |
| OnShowEvent | Occurs when associated element is shown within the immersive virtual reality experience |
| OnHideEvent | Occurs when associated element is hidden within the immersive virtual reality experience |

TABLE 1-continued

| Event | Description |
| --- | --- |
| OnGazeEvent | Occurs when user gazes at associated element for a definable amount of time |
| OnClickEvent | Occurs when user clicks or selects associated element |

Behavior 606 may be defined by a set of one or more instructions that media player device 500 performs with respect to element 602 in response to an occurrence of event 604. Table 2, shown below, lists exemplary behaviors that may be defined and used within specification file 600 and that may be associated with event 604 and element 602. Additional or alternative behaviors may be defined and used within specification file 600 as may serve a particular implementation.

TABLE 2

| Behavior | Description |
| --- | --- |
| ShowShowable | Shows a particular object within the immersive virtual reality experience in accordance with definable rules |
| HideShowable | Hides a particular object within the immersive virtual reality experience in accordance with definable rules |
| ToggleShowable | Toggles between showing one or more objects within the immersive virtual reality experience in accordance with definable rules |
| ShowAd | Shows a particular advertisement within the immersive virtual reality experience in response to an occurrence of behavior's associated event |
| HideAd | Hides a particular advertisement within the immersive virtual reality experience in response to an occurrence of behavior's associated event |
| ReportAdClicked | Reports to a definable entity when an advertisement presented within the immersive virtual reality experience is clicked on by a user |
| ReportAdGazed | Reports to a definable entity when an advertisement presented within the immersive virtual reality experience is gazed at by a user for a definable amount of time |

Various examples of elements that may be included within specification file 600 and fields that may be used to define the elements (and also define associations between the elements and events and behaviors) will now be provided. It will be recognized that the methods and systems described herein may provide for additional or alternative elements as may serve a particular implementation. In some examples, system 400 populates data for each of the fields shown in the following examples. This may occur automatically, in response to input provided by a user (e.g., a virtual reality content creator), and/or in any other manner.

Table 3, shown below, shows exemplary fields that may be used to define an element entitled "VR 360 Player", which refers to a 360 degree virtual reality video that may be presented to the user by way of media player device 500 during the immersive virtual reality experience.

TABLE 3

| Field | Type |
| --- | --- |
| uniqueName | string |
| url | string (url) |

TABLE 3-continued

| Field | Type |
| --- | --- |
| cameraType | string (enum) |
| domeOrientation | string (direction) |
| cameraPovAngle | float (degrees) |
| onTimeInVideoList | Collection <OnTimeInVideo> |

A brief description of each of the fields shown in Table 3 will now be provided.

The field "uniqueName" may be populated with a name of the element entitled "VR 360 Player". This name may be referenced by other portions of specification file 600 in order refer to this particular element.

The field "url" may be populated with a link (e.g., a URL) to the element entitled "VR 360 Player". This link may be used by media player device 500 to acquire (e.g., download by way of network 110) the 360 degree virtual reality video from a source (e.g., a server that implements system 400 and/or a server separate from system 400) for presentation to the user.

The field "cameraType" specifies a particular camera type that was used to capture the 360 degree virtual reality video. For example, field "cameraType" may be populated with one of the following supported camera types: SP360, FISHEYE, EQUIRECTANGULAR, EQUIRECTANGULAR-3D, etc.

The field "domeOrientation" may be populated with data that describes the orientation of the camera as the camera captures the 360 degree virtual reality video. For example, this field may be populated with one of the following options: up, down, sideForward, sideDown, SideBackward, or sideUp.

The field "cameraPovAngle" may be populated with the initial orientation of the camera in the xy plane as the camera captures the 360 degree virtual reality video. This allows the viewer to be oriented to an initial direction within the 360 degree virtual reality video.

The field "onTimeInVideoList" may be populated with one or more events, such as one or more instances of the "OnTimeInVideo" event described above. Behaviors associated with the one or more events may also be indicated in this field. In this manner, the field "onTimeInVideoList" may be used to associate both an event and a behavior with the element.

FIG. 7 illustrates an exemplary code implementation 702 of data that defines the element entitled "VR 360 Player" described above in connection with Table 3 and that may be included in specification file 600. Code implementation 702 may adhere to a JSON format or any other format as may serve a particular implementation.

Table 4, shown below, shows exemplary fields that may be used to define an element entitled "Ad Target", which refers to an object and/or location within the immersive virtual reality experience that is associated with a presentation of an advertisement within the immersive virtual reality world. For example, the ad target may be a 3D object (e.g., a 3D panel, etc.) or a 2D image (e.g., a banner, etc.).

TABLE 4

| Field | Type |
| --- | --- |
| target | string |
| relativeToName | string |
| onClick | OnClickEvent |
| onGaze | OnGazeEvent |

A brief description of each of the fields shown in Table 4 will now be provided.

The field "target" may be populated with an identifier that identifies the ad target. For example, this may be an image URL, an advertisement DCN name, etc.

The field "relativeToName" may be populated with a name of an object relative to which the advertisement will be displayed. For example, this object may be a focus point icon that indicates a focus point of the user as the user experiences the immersive virtual reality experience.

The field "onClick" may be populated with data that defines an "onClick" event that is associated with the "Ad Target" element. A behavior associated with the "onClick" event and that may be performed in response to a user clicking on the "Ad Target" element may also be specified in this field.

The field "onGaze" may be populated with data that defines an "onGaze" event that is associated with the "Ad Target" element. A behavior associated with the "onGaze" event and that may be performed in response to a user gazing upon the "Ad Target" element for a definable amount of time may also be specified in this field.

Figure 8:
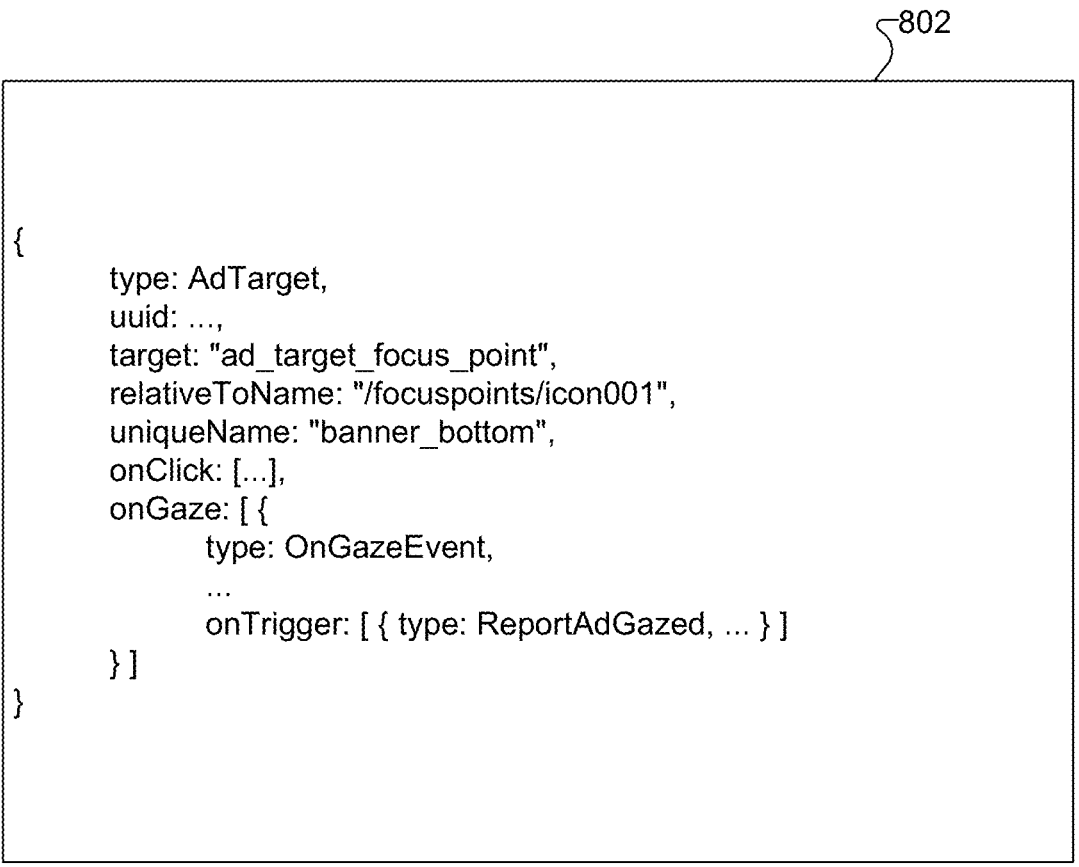

FIG. 8 illustrates an exemplary code implementation 802 of data that defines the element entitled "Ad Target" described above in connection with Table 4 and that may be included in specification file 600. Code implementation 802 may adhere to a JSON format or any other format as may serve a particular implementation.

Table 5, shown below, shows exemplary fields that may be used to define an element entitled "Focus Point Icon", which refers to an object that identifies a focus point of a user as the user experiences the immersive virtual reality experience.

TABLE 5

| Field | Type |
| --- | --- |
| angleX | float (degrees) |
| angleY | float (degrees) |
| depthZ | float |
| icon | string (URL) |
| iconClicked | string (URL) |

A brief description of each of the fields shown in Table 5 will now be provided.

The fields "angleX" and "angleY" may be populated with location data that specifies a location of the focus point icon within a 360 degree dome environment of the immersive virtual reality experience.

The field "depthZ" may be populated with data representative of a depth of the focus point icon within a 360 degree dome environment of the immersive virtual reality experience.

The field "icon" may be populated with a source location (e.g., an image URL or local file path) for the focus point icon.

The field "iconClicked" may be populated with a source location (e.g., an image URL or local file path) for an image that represents a clicked focus point icon.

Additional fields may be used to specify events and behaviors associated with the "Focus Point Icon" element.

Figure 9:

FIG. 9 illustrates an exemplary code implementation 902 of data that defines the element entitled "Focus Point Icon" described above in connection with Table 5 and that may be included in specification file 600. Code implementation 902 may adhere to a JSON format or any other format as may serve a particular implementation.

Table 6, shown below, shows exemplary fields that may be used to define an element entitled "Popup Image", which refers to a popup image that may be displayed relative to an object (e.g., a focus point icon) within the immersive virtual reality experience.

TABLE 6

| Field | Type |
|---|---|
| imageURL | url |
| headerText | string |
| bodyText | string |
| relativeToName | string |
| popupOffsetX | float (pixels) |
| popupOffsetY | float (pixels) |
| onClick | OnClickEvent |
| onGaze | OnGazeEvent |

A brief description of each of the fields shown in Table 6 will now be provided.

The field "imageURL" may be populated with a link (e.g., a URL) of the popup image that is to be displayed.

The field "headerText" may be populated with header text that is to be displayed together with the popup image.

The field "bodyText" may be populated with body text that is to be displayed together with the popup image.

The field "relativeToName" may be populated with a name of an object relative to which the popup image will be displayed. For example, this object may be a focus point icon that indicates a focus point of the user as the user experiences the immersive virtual reality experience.

The fields "popupOffsetX" and "popupOffsetY" may be populated with location data that indicates an offset (e.g., in pixels) relative to the center of the "relativeToName" object.

The field "onClick" may be populated with data that defines an "onClick" event that is associated with the popup image. A behavior associated with the "onClick" event and that may be performed in response to a user clicking on the popup image may also be specified in this field.

The field "onGaze" may be populated with data that defines an "onGaze" event that is associated with the popup image. A behavior associated with the "onGaze" event and that may be performed in response to a user gazing upon the popup image for a definable amount of time may also be specified in this field.

Figure 10:
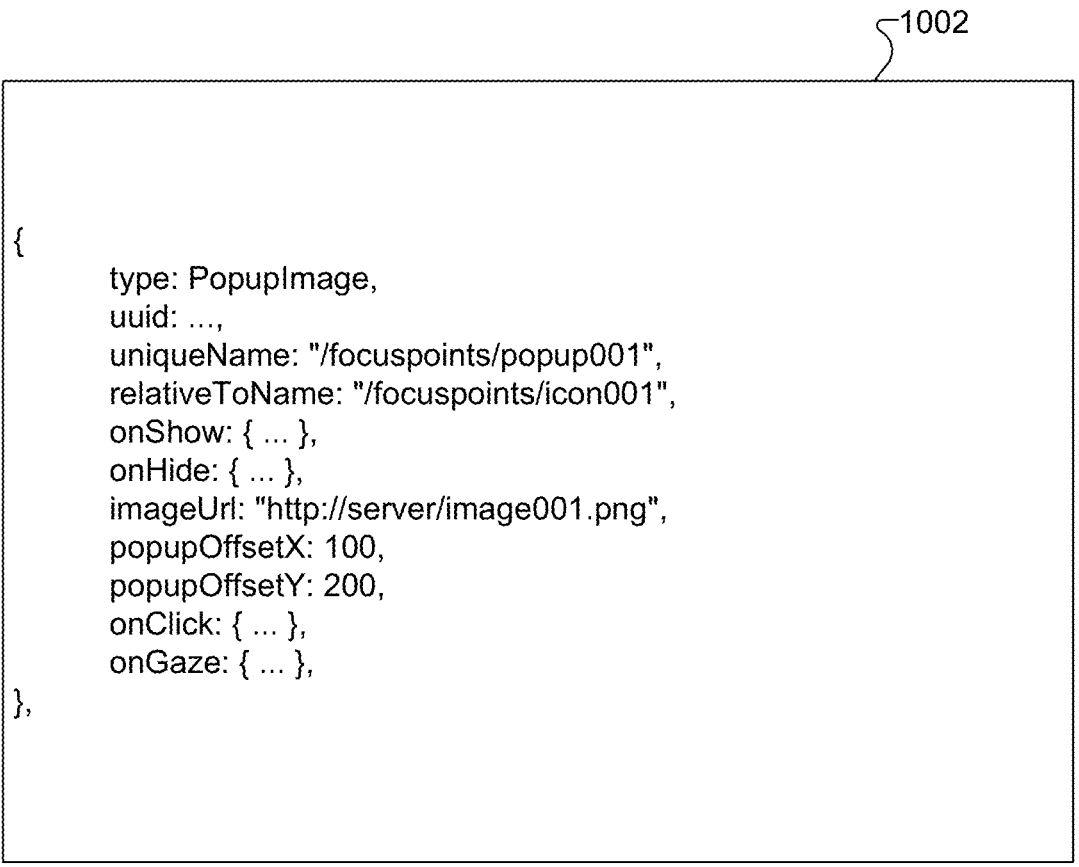

FIG. 10 illustrates an exemplary code implementation 1002 of data that defines the element entitled "Popup Image" described above in connection with Table 6 and that may be included in specification file 600. Code implementation 1002 may adhere to a JSON format or any other format as may serve a particular implementation.

Table 7, shown below, shows exemplary fields that may be used to define an element entitled "Popup Text", which refers to popup text that may be displayed relative to an object (e.g., a focus point icon) within the immersive virtual reality experience.

TABLE 7

| Field | Type |
|---|---|
| headerText | string |
| bodyText | string |
| relativeToName | string |
| onClick | OnClickEvent |
| onGaze | OnGazeEvent |

A brief description of each of the fields shown in Table 7 will now be provided.

The field "headerText" may be populated with header text that is to be displayed within the popup text.

The field "bodyText" may be populated with body text that is to be displayed within the popup text.

The field "relativeToName" may be populated with a name of an object relative to which the popup text will be displayed. For example, this object may be a focus point icon that indicates a focus point of the user as the user experiences the immersive virtual reality experience.

The field "onClick" may be populated with data that defines an "onClick" event that is associated with the popup text. A behavior associated with the "onClick" event and that may be performed in response to a user clicking on the popup text may also be specified in this field.

The field "onGaze" may be populated with data that defines an "onGaze" event that is associated with the popup text. A behavior associated with the "onGaze" event and that may be performed in response to a user gazing upon the popup text for a definable amount of time may also be specified in this field.

Figure 11:
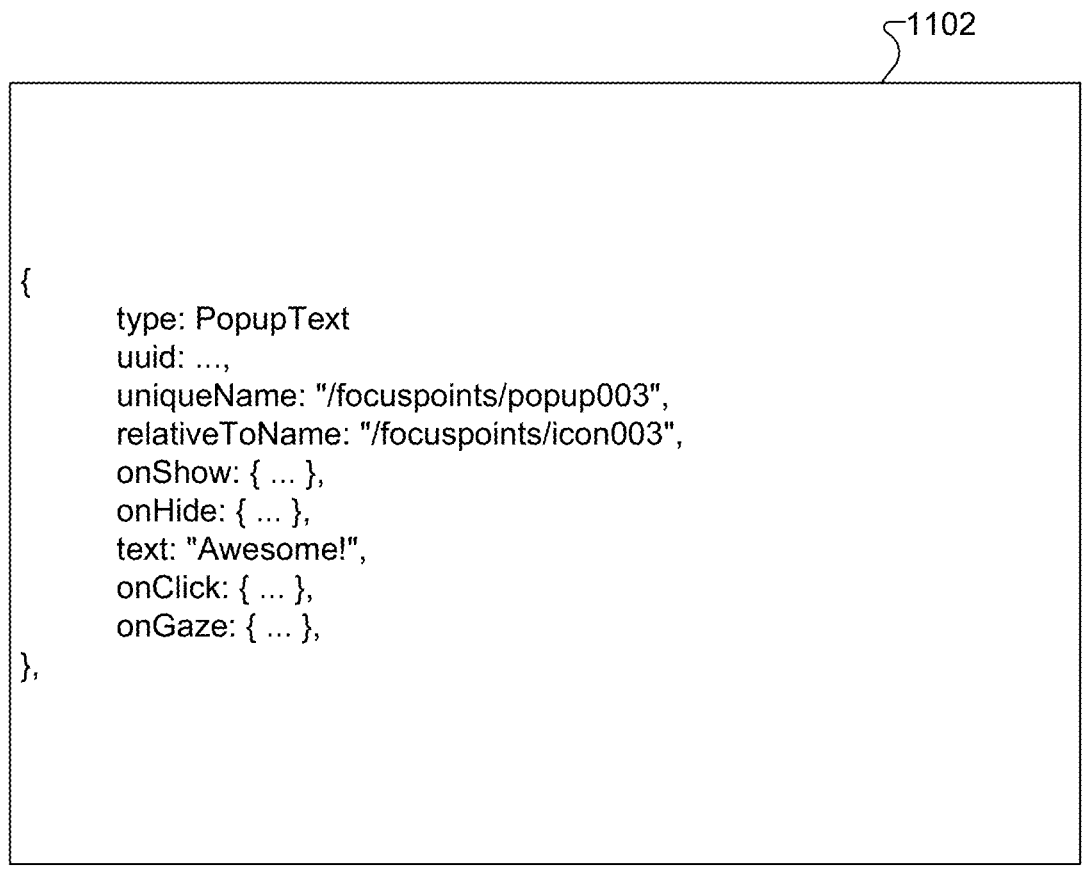

FIG. 11 illustrates an exemplary code implementation 1102 of data that defines the element entitled "Popup Text" described above in connection with Table 7 and that may be included in specification file 600. Code implementation 1102 may adhere to a JSON format or any other format as may serve a particular implementation.

It will be recognized that additional or alternative elements may be defined and included in specification file 600. For example, a "sound" element, which may be configured to present sound (e.g., an audio recording) to the user while the user experiences the immersive virtual reality experience may be defined and included in specification file 600, as may many other types of elements.

In some examples, the events included in specification file 600 may be selected from an event library of pre-established and definable events. Likewise, the behaviors included in specification file 600 may be selected from a behavior library of pre-established and definable behaviors. The event library and the behavior library may be maintained by system 400. By so doing, system 400 may ensure that media player device 500 (and other media player devices that access the specification file 600) is capable of detecting each event included in the event library and of performing each behavior included in the behavior library.

For example, prior to transmitting specification file 600 to media player device 500, system 400 may configure media player device 500 to be capable of detecting each event included in the event library and of performing each behavior included in the behavior library. This may be performed in any suitable manner. For example, system 400 may provide media player device 500 with software (e.g., in the form of a new software install or a software update) that, when executed by media player device 500, may configure a codec included in media player device 500 to be capable of detecting each event included in the event library and of performing each behavior included in the behavior library. Once configured in this manner, media player device 500 may recognize and appropriately process data that defines each event included in the event library and each behavior included in the behavior library.

System 400 may update event library and/or behavior library with new events and/or behaviors in any suitable manner. For example, system 400 may receive a request to create a new behavior that combines functionality of a subset of behaviors included in the behavior library. To illustrate, a particular virtual reality content creator may find that he or she associates the same three behaviors with a particular event and element on a repeated basis. This virtual reality content creator may accordingly submit a request to system 400 to combine the three behaviors into a single new behavior so that the virtual reality content creator can be more efficient in the way the virtual reality content creator creates virtual content. In response, system 400 may create the new behavior (e.g., automatically or based on user input) and add the new behavior to the behavior library. Because the new behavior is a combination of three behaviors already included in the behavior library, media player device 500 may already be capable of performing the new behavior (i.e., without being updated by system 500).

As another example, system 400 may receive a request to create a new behavior that is not based on a combination of a subset of behaviors included in the behavior library. In response, system 400 may create the new behavior and add the new behavior to the behavior library. Because this new behavior is not based on a combination of behaviors included in the behavior library, system 400 may reconfigure media player device 500 to be capable of performing the new behavior (e.g., by pushing an update to media player device 500).

In some examples, system 400 may generate specification file 600 based on input provided by a virtual reality content creator (e.g., prior to the specification file 600 being transmitted to media player device 500). For example, a virtual reality content creator may utilize a graphical user interface provided by system 400 to identify objects that are to be elements linked to events and behaviors in specification file 600. In response, system 400 may generate specification file 600 accordingly.

Figure 12:
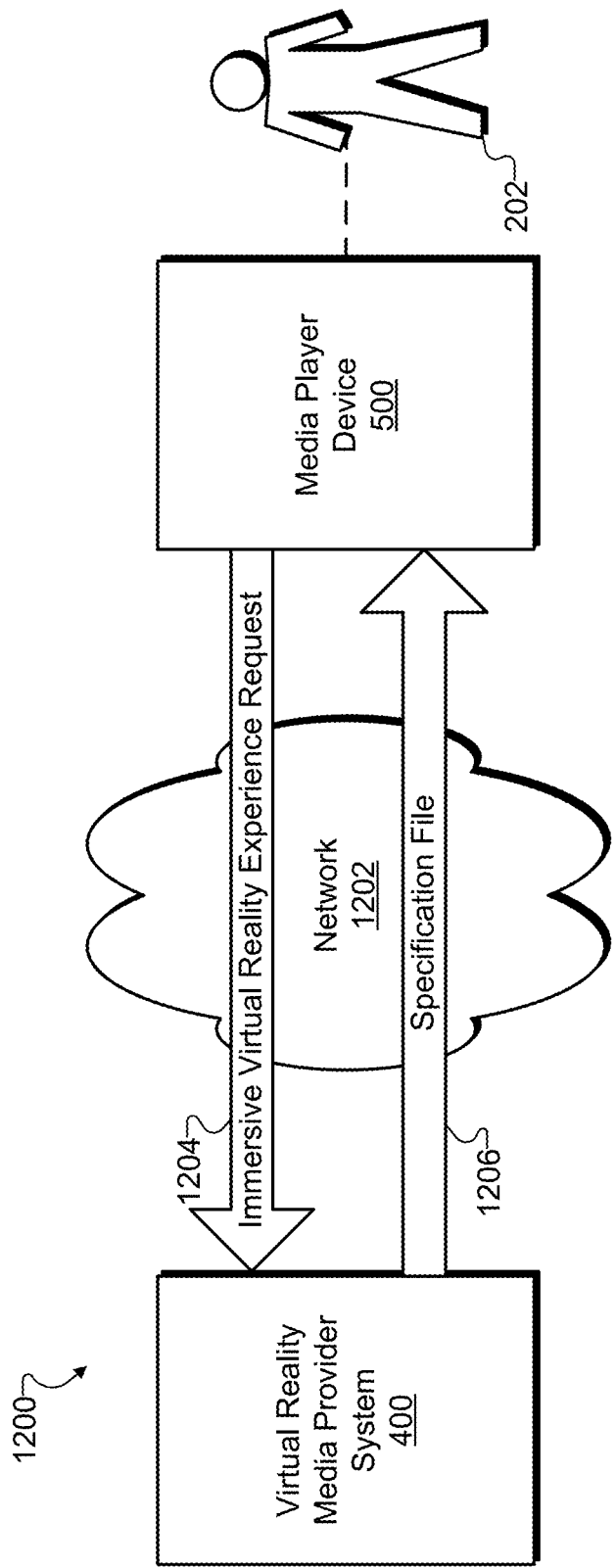
FIG. 12 illustrates an exemplary network-based virtual reality media delivery configuration according to principles described herein.

FIG. 12 illustrates an exemplary network-based virtual reality media delivery configuration 1200 of system 400 and media player device 500. Specifically, as shown in configuration 1200, media player device 500 is being used by user 202 (e.g., to experience an immersive virtual reality experience) and is communicatively coupled to system 400 via a network 1202. Network 1202 may be the same or similar to network 110, described above in relation to FIG. 1.

As shown, to facilitate an immersive virtual reality experience for user 202, media player device 500 may transmit an immersive virtual reality experience request ("request") to system 400 by way of network 1202. This request is represented by arrow 1204. In response to the request, system 400 may transmit a specification file corresponding to the immersive virtual reality experience to media player device 500. This transmission of the specification file is represented by arrow 1206.

System 400 may transmit the specification file to media player device 500 in any suitable manner. For example, system 400 may transmit the specification file in the form of a text-based file (e.g., a JSON file) to media player device 500. As another example, system 400 may transmit the specification file in the form of binary data encoded into a video stream (or any other type of data stream).

Media player device 500 may use the specification file to provide the user with the immersive virtual reality experience. For example, media player device 500 may use links specified within the specification file to acquire and present elements defined in the specification file, detect an occurrence of one or more events that are associated with the elements in the specification file, and perform one or more behaviors that are associated with the one or more events in the specification file.

In some examples, after the specification file has already been transmitted by system 400 to media player device 500, system 500 may detect an update that is to be made to the specification file that will affect the immersive virtual reality experience being provided by media player device 500 at a future point in time. For example, while media player device 500 is using the specification file to provide the immersive virtual reality experience to a user, a virtual reality content creator may provide a request for system 400 to update the specification file to include an additional or alternative element, event, and/or behavior. In response, system 400 may dynamically update a version of the specification file that is maintained by system 400. System 400 may also dynamically update the version of specification file being used by media player device 500 with the requested update (e.g., by transmitting a command to media player device 500 for device to update the specification file being used by media player device 500 with the requested update). This dynamic update may be performed while media player device 500 is presenting the immersive virtual reality experience to user 202 in a manner that does not interfere with the presentation of the immersive virtual reality experience to user 202.

Figure 13:
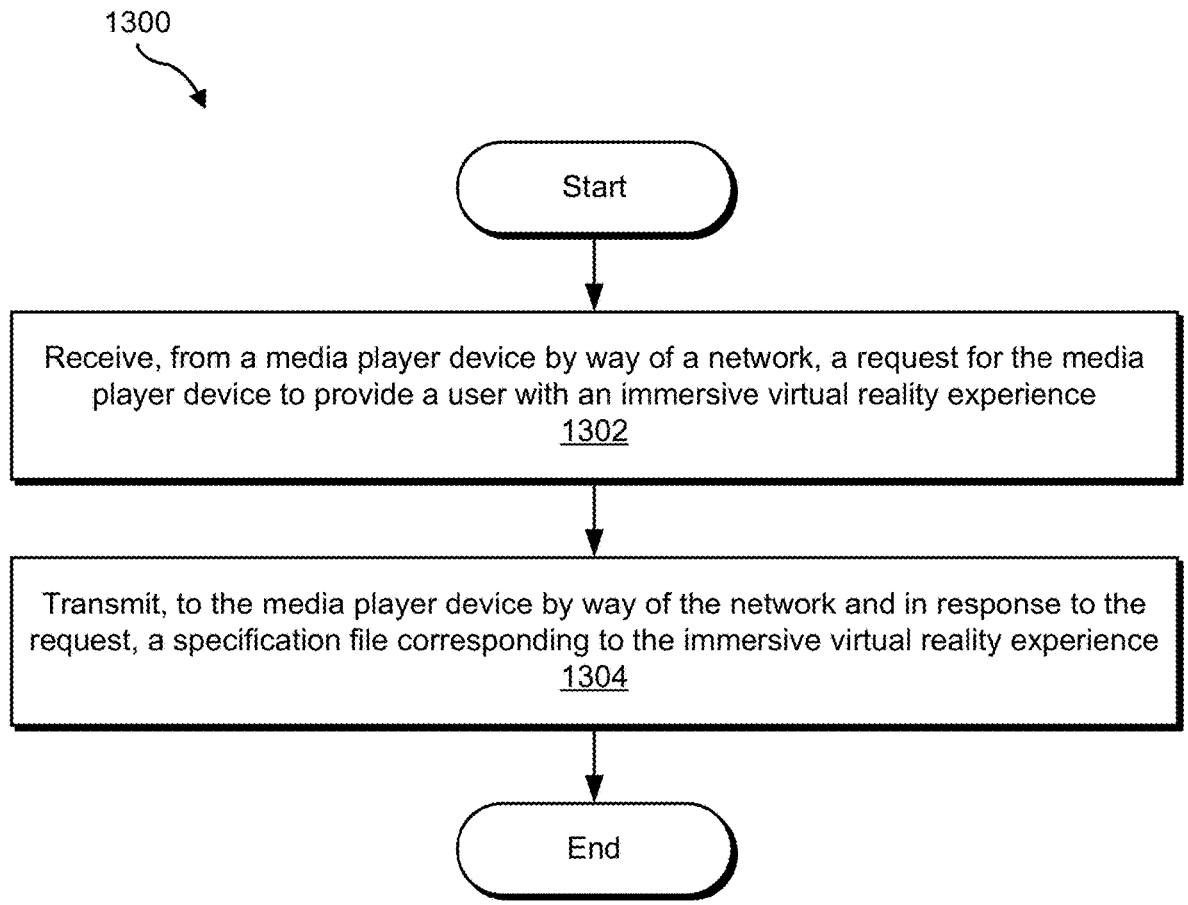
FIG. 13 illustrates an exemplary method for specification file based delivery of an immersive virtual reality experience according to principles described herein.

FIG. 13 illustrates an exemplary method 1300 for specification file based delivery of an immersive virtual reality experience. While FIG. 13 illustrates exemplary operations according to one embodiment, other embodiments may omit, add to, reorder, and/or modify any of the operations shown in FIG. 13. One or more of the operations shown in FIG. 13 may be performed by system 400 and/or any implementation thereof.

In operation 1302, a virtual reality media provider system receives, from a media player device by way of a network, a request for the media player device to provide a user with an immersive virtual reality experience. Operation 1302 may be performed in any of the ways described herein.

In operation 1304, the virtual reality media provider system transmits, to the media player device by way of the network and in response to the request, a specification file corresponding to the immersive virtual reality experience. As described herein, the specification file includes data that defines a plurality of elements included in the immersive virtual reality experience (e.g., by providing a plurality of links for use by the media player device in acquiring, by way of the network, the plurality of elements while providing the user with the immersive virtual reality experience). The specification file also associates an event with a particular element included in the plurality of elements, and associates a behavior with the event that is associated with the particular element. The behavior may be configured to be performed (e.g., by the media player device) with respect to the particular element in response to an occurrence of the event within the immersive virtual reality experience. Operation 1304 may be performed in any of the ways described herein.

Figure 14:
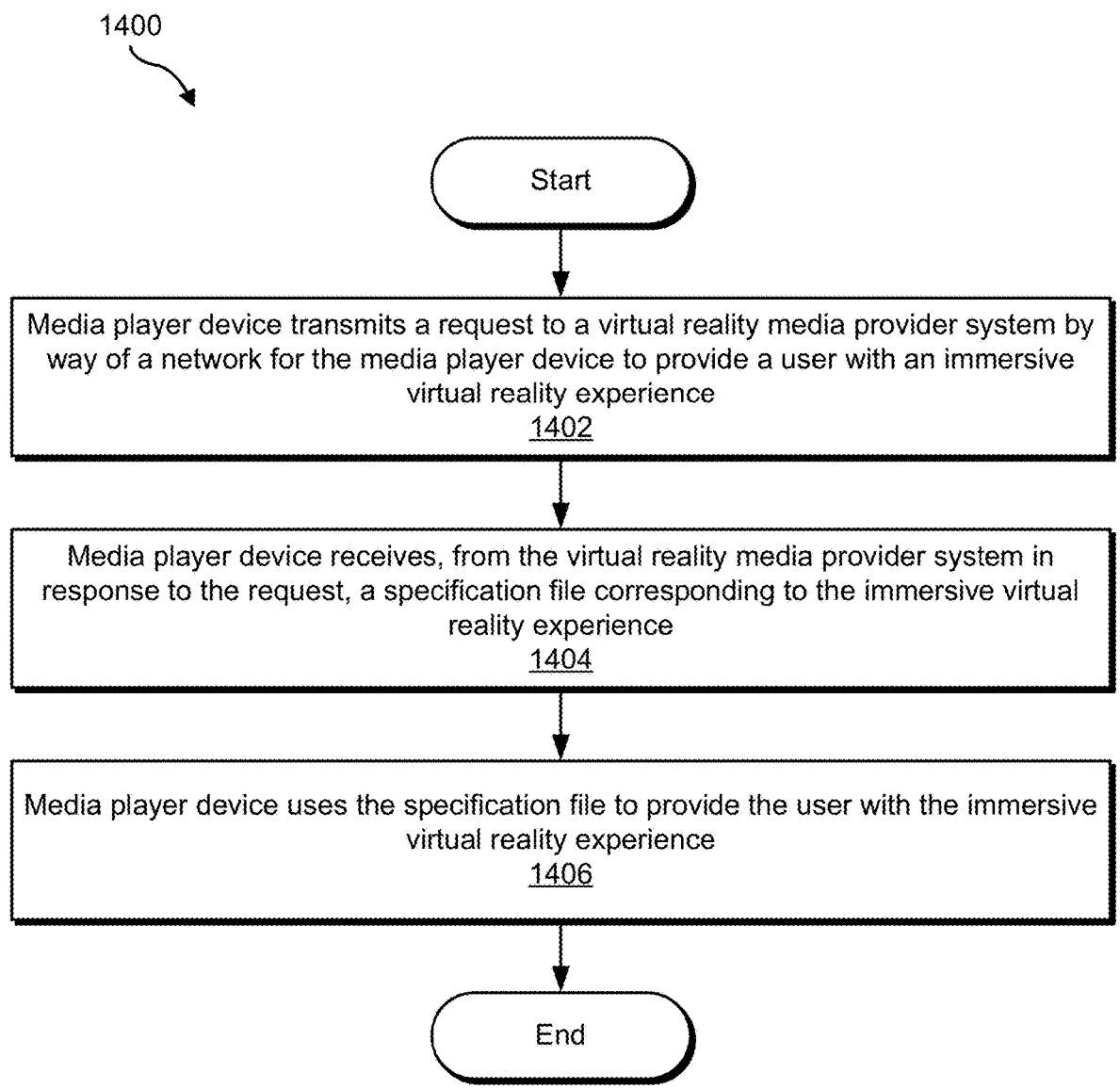
FIG. 14 illustrates another exemplary method for specification file based delivery of an immersive virtual reality experience according to principles described herein.

FIG. 14 illustrates another exemplary method 1400 for specification file based delivery of an immersive virtual reality experience. While FIG. 14 illustrates exemplary operations according to one embodiment, other embodiments may omit, add to, reorder, and/or modify any of the operations shown in FIG. 14. One or more of the operations shown in FIG. 14 may be performed by media player device 500 and/or any implementation thereof.

In operation 1402, a media player device transmits a request to a virtual reality media provider system by way of a network for the media player device to provide a user with an immersive virtual reality experience. Operation 1402 may be performed in any of the ways described herein.

In operation 1404, the media player device receives, from the virtual reality media provider system in response to the request, a specification file corresponding to the immersive virtual reality experience. As described herein, the specification file includes data that defines a plurality of elements included in the immersive virtual reality experience (e.g., by providing a plurality of links for use by the media player device in acquiring, by way of the network, the plurality of elements while providing the user with the immersive virtual reality experience). The specification file also associates an event with a particular element included in the plurality of elements, and associates a behavior with the event that is associated with the particular element. The behavior may be configured to be performed (e.g., by the media player device) with respect to the particular element in response to an occurrence of the event within the immersive virtual reality experience. Operation 1404 may be performed in any of the ways described herein.

In operation 1406, the media player device uses the specification file to provide the user with the immersive virtual reality experience. For example, the media player device may acquire, based on a link included in the plurality of links and by way of the network, the particular element, detect the occurrence of the event that is associated with the particular element within the specification file, and perform, in response to detecting the occurrence of the event, the behavior that is associated with the event in the specification file. Operation 1406 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 15:
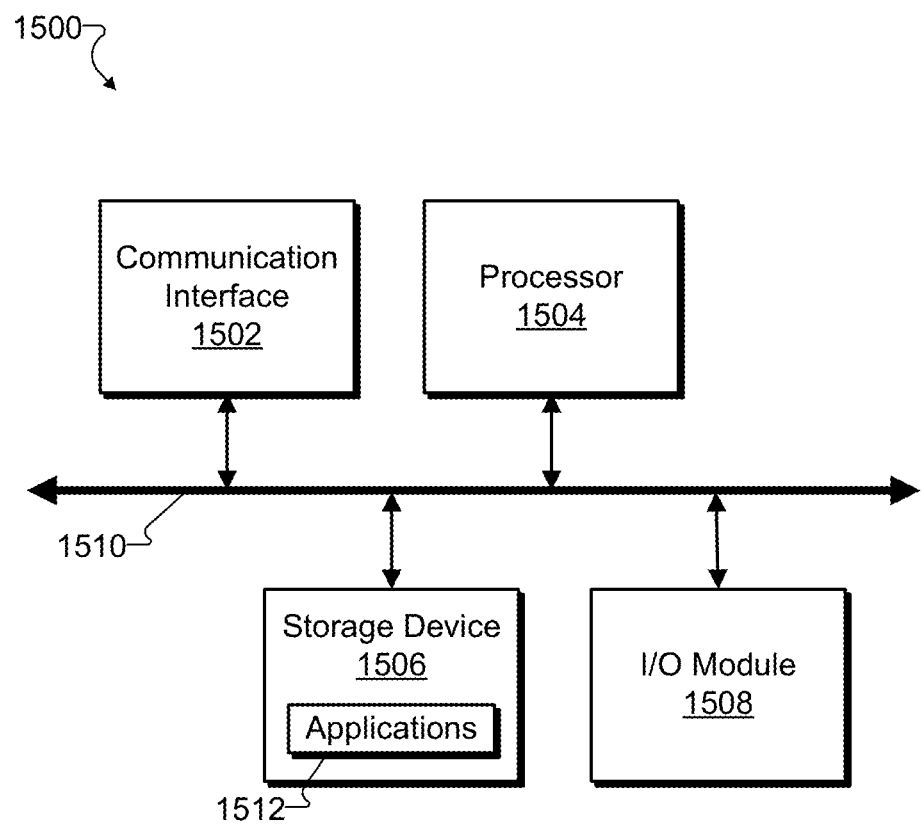
FIG. 15 illustrates an exemplary computing device according to principles described herein.

FIG. 15 illustrates an exemplary computing device 1500 that may be specifically configured to perform one or more of the processes described herein. As shown in FIG. 15, computing device 1500 may include a communication interface 1502, a processor 1504, a storage device 1506, and an input/output ("I/O") module 1508 communicatively connected via a communication infrastructure 1510. While an exemplary computing device 1500 is shown in FIG. 15, the components illustrated in FIG. 15 are not intended to be limiting. Additional or alternative components may be used in other embodiments. Components of computing device 1500 shown in FIG. 15 will now be described in additional detail.

Communication interface 1502 may be configured to communicate with one or more computing devices. Examples of communication interface 1502 include, without limitation, a wired network interface (such as a network interface card), a wireless network interface (such as a wireless network interface card), a modem, an audio/video connection, and any other suitable interface.

Processor 1504 generally represents any type or form of processing unit capable of processing data or interpreting, executing, and/or directing execution of one or more of the instructions, processes, and/or operations described herein. Processor 1504 may direct execution of operations in accordance with one or more applications 1512 or other computer-executable instructions such as may be stored in storage device 1506 or another computer-readable medium.

Storage device 1506 may include one or more data storage media, devices, or configurations and may employ any type, form, and combination of data storage media and/or device. For example, storage device 1506 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1506. For example, data representative of one or more executable applications 1512 configured to direct processor 1504 to perform any of the operations described herein may be stored within storage device 1506. In some examples, data may be arranged in one or more databases residing within storage device 1506.

I/O module 1508 may include one or more I/O modules configured to receive user input and provide user output. One or more I/O modules may be used to receive input for a single virtual reality experience. I/O module 1508 may include any hardware, firmware, software, or combination thereof supportive of input and output capabilities. For example, I/O module 1508 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1508 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1508 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1500. For example, one or more applications 1512 residing within storage device 1506 may be configured to direct processor 1504 to perform one or more processes or functions associated with management facility 402 of system 400 and/or management facility 502 of media player device 500. Likewise, storage facility 404 of system 400 and/or storage facility 504 of media player device 500 may be implemented by or within storage device 1506.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
receiving, by a virtual reality media provider system from a media player device by way of a network, a request for the media player device to provide a user with an immersive virtual reality experience;
transmitting, by the virtual reality media provider system to the media player device by way of the network and in response to the request, a specification file corresponding to the immersive virtual reality experience, the specification file comprising data that
defines a plurality of elements included in the immersive virtual reality experience by providing a plurality of links for use by the media player device in acquiring, by way of the network, the plurality of elements while providing the user with the immersive virtual reality experience,
defines an event and associates the event with a particular element included in the plurality of elements, and
defines a behavior and associates the behavior with the event that is associated with the particular element, the behavior configured to be performed, by the media player device based on the data defining the event and the behavior in the specification file, with respect to the particular element in response to an occurrence of the event within the immersive virtual reality experience; and
providing, by the virtual reality media provider system, the media player device with instructions that, when executed by the media player device, configure a codec included in the media player device to be capable of detecting the event defined in the specification file transmitted to the media player device and performing the behavior defined in the specification file transmitted to the media player device.

2. The method of claim 1, wherein the specification file is readable by a plurality of different media player devices operating within a plurality of different platforms.

3. The method of claim 1, further comprising generating, by the virtual reality media provider system based on input provided by a virtual reality content creator, the specification file prior to transmitting the specification file to the media player device.

4. The method of claim 1, further comprising:
detecting, by the virtual reality media provider system while the media player device is providing the immersive virtual reality experience, an update that is to be made to the specification file that affects the immersive virtual reality experience being provided by the media player device at a future point in time; and
dynamically updating, by the virtual reality media provider system in response to the detecting of the update and while the media player device is providing the immersive virtual reality experience, the specification file used by the media player device with the update.

5. The method of claim 1, wherein the transmitting of the specification file to the media player device comprises transmitting a text-based file to the media player device.

6. The method of claim 1, wherein the transmitting of the specification file comprises transmitting the specification file as binary data encoded into a video stream.

7. The method of claim 1, further comprising:
maintaining, by the virtual reality media provider system, a behavior library of pre-established and definable behaviors; and
configuring, by the virtual reality media provider system, the media player device to be capable of performing each behavior included in the behavior library;
wherein the behavior that is associated with the event that is associated with the particular element is included in the behavior library.

8. The method of claim 7, further comprising:
receiving, by the virtual reality media provider system, a request to create a new behavior that combines functionality of a subset of behaviors included in the behavior library;
creating, by the virtual reality media provider system in response to the request, the new behavior; and
adding, by the virtual reality media provider system, the new behavior to the behavior library.

9. The method of claim 7, further comprising:
receiving, by the virtual reality media provider system, a request to create a new behavior that is not based on a combination of a subset of behaviors included in the behavior library;
creating, by the virtual reality media provider system in response to the request, the new behavior;
adding, by the virtual reality media provider system, the new behavior to the behavior library; and reconfiguring, by the virtual reality media provider system, the media player device to be further capable of performing the new behavior.

10. The method of claim 1, further comprising:
maintaining, by the virtual reality media provider system, an event library of pre-established and definable events; and
configuring, by the virtual reality media provider system, the media player device to be capable of detecting each event included in the event library;
wherein the event that is associated with the particular element is included in the event library.

11. The method of claim 1, embodied as computer-executable instructions on at least one non-transitory computer-readable medium.

12. A method comprising:
transmitting, by a media player device, a request to a virtual reality media provider system by way of a network for the media player device to provide a user with an immersive virtual reality experience;
receiving, by the media player device from the virtual reality media provider system in response to the request, a specification file corresponding to the immersive virtual reality experience, the specification file comprising data that
defines a plurality of elements included in the immersive virtual reality experience by providing a plurality of links for use by the media player device in acquiring, by way of the network, the plurality of elements while providing the user with the immersive virtual reality experience,
defines and associates an event with a particular element included in the plurality of elements, and
defines and associates a behavior with the event that is associated with the particular element, the behavior configured to be performed with respect to the particular element in response to an occurrence of the event within the immersive virtual reality experience;
receiving, by the media player device from the virtual reality media provider system, instructions that, when executed by the media player device, configure a codec included in the media player device to be capable of detecting the event defined in the specification received from the media player device and performing the behavior defined in the specification received from the media player device;
executing, by the media player device, the instructions to configure the codec in the media player device to be capable of detecting the event and performing the behavior; and
using, by the media player device, the specification file to provide the user with the immersive virtual reality experience by
acquiring, based on a link included in the plurality of links and by way of the network, the particular element,
detecting, based on the data in the specification file that defines the event, the occurrence of the event that is associated with the particular element within the specification file, and
performing, based on the data in the specification file that defines the behavior and in response to the detecting of the occurrence of the event, the behavior that is associated with the event in the specification file.

13. The method of claim 12, embodied as computer-executable instructions on at least one non-transitory computer-readable medium.

14. A system comprising:
at least one physical computing device that:
receives, from a media player device by way of a network, a request for the media player device to provide a user with an immersive virtual reality experience;
transmits, to the media player device by way of the network and in response to the request, a specification file corresponding to the immersive virtual reality experience, the specification file comprising data that
defines a plurality of elements included in the immersive virtual reality experience by providing a plurality of links for use by the media player device in acquiring, by way of the network, the plurality of elements while providing the user with the immersive virtual reality experience,
defines an event and associates the event with a particular element included in the plurality of elements, and
defines a behavior and associates the behavior with the event that is associated with the particular element, the behavior configured to be performed, by the media player device based on the data defining the event and the behavior in the specification file, with respect to the particular element in response to an occurrence of the event within the immersive virtual reality experience; and
provides the media player device with instructions that, when executed by the media player device, configure a codec included in the media player device to be capable of detecting the event defined in the specification file transmitted to the media player device and performing the behavior defined in the specification file transmitted to the media player device.

15. The system of claim 14, wherein the specification file adheres to a data input format that is readable by a plurality of different media player devices operating within a plurality of different platforms.

16. The system of claim 14, wherein the at least one physical computing device:
detects, while the media player device is providing the immersive virtual reality experience, an update that is to be made to the specification file that will affect the immersive virtual reality experience being provided by the media player device at a future point in time; and
dynamically updates, in response to the detection of the update and while the media player device is providing the immersive virtual reality experience, the specification file used by the media player device with the update.

17. The system of claim 14, wherein the at least one physical computing device transmits the specification file to the media player device by at least one of transmitting a text-based file to the media player device and transmitting the specification file as binary data encoded into a video stream.

18. The system of claim 14, wherein the at least one physical computing device:
maintains a behavior library of pre-established and definable behaviors; and
configures the media player device to be capable of performing each behavior included in the behavior library;

wherein the behavior that is associated with the event that is associated with the particular element is included in the behavior library.

19. The system of claim 18, wherein the at least one physical computing device:
receives a request to create a new behavior that combines functionality of a subset of behaviors included in the behavior library;
creates, in response to the request, the new behavior; and adds the new behavior to the behavior library.

20. The system of claim 18, wherein the at least one physical computing device:
receives a request to create a new behavior that is not based on a combination of a subset of behaviors included in the behavior library;
creates, in response to the request, the new behavior;
adds the new behavior to the behavior library; and
reconfigures the media player device to be further capable of performing the new behavior.

21. The method of claim 1, wherein the providing the media player device with the instructions that, when executed by the media player device, configures the codec included in the media player device to be capable of detecting the event and performing the behavior comprises transmitting the instructions to the media player device as a new software install.

22. The method of claim 1, wherein the providing the media player device with the instructions that, when executed by the media player device, configures the codec included in the media player device to be capable of detecting the event and performing the behavior comprises pushing the instructions to the media player device as a software update.

23. The method of claim 1, wherein the providing the media player device with the instructions is performed prior to the transmitting of the specification file.

* * * * *